UNITED STATES PATENT OFFICE.

JOHN DANIEL GRÜNEBERG, OF PHILADELPHIA, PENNSYLVANIA.

IMPROVEMENT IN THE MANUFACTURE OF PLATED METAL.

Specification forming part of Letters Patent No. 51,714, dated December 26, 1865.

*To all whom it may concern:*

Be it known that I, JOHN DANIEL GRÜNEBERG, of the city of Philadelphia, in the county of Philadelphia and State of Pennsylvania, have invented a new and Improved Article of Plated Metal, and also one of a covered metal, which, in all its good qualities, compositions, and uses, is equal to the purest tin, being at the same time much less expensive, and therefore of very great importance and advantage to the public.

Both metals are composed and made, as specified, in the following manner, viz:

My newly invented and heretofore unknown metals are manufactured:

First, I make an alloy composed of one hundred (100) pounds of lead and four (4) ounces of zinc or copper, or one-half of zinc and one-half of copper, or any other metal which will make lead harder, more durable, and stronger than if it was lead only. I take an iron mold the inside dimensions of which are five inches wide, thirty inches long, and three-fourths of an inch thick, but flat, wedge-shaped at the ends, in order that the casting may be easily caught by the pair of rollers. In such a mold I then cast a block of the above-named alloy-metal and likewise one of tin. I then reduce the one of tin, by passing it through a pair of iron rollers, to one-fourth of its original thickness, causing it to come out in strips. I then take the above block of alloy-metal and allow it to pass through a pair of iron rollers only for the purpose of making it quite smooth. I now take one of the above-prepared strips of tin and spread it out on a clean smooth table and lay the above-prepared block of alloy-metal upon the strip of tin so it will be entirely covered by lapping over, and rub it smoothly down in order to prevent any air-blisters or wrinkles. I then take this prepared strip of metals and pass it through a pair of highly-polished iron rollers by hard pressure, compelling it to become evenly united into one band of solid metal carefully covered with tin.

Secondly, I also take a square block of the aforementioned alloy-metal and reduce it, by passing it through a pair of highly-polished iron rollers, to such a thickness and shape as will render it applicable to my purpose. I then prepare a solution or bath of water, (98° Fahrenheit) ten gallons, (eighty pounds,) and muriate or oxide of tin, one pound. I then dip the above-mentioned alloy-metal in the foregoing solution for the space of ten to twenty minutes, after which time the alloy-metal will be sufficiently covered. I then polish it by rubbing it with a soft cloth or piece of leather, when it will not only appear but be equal in quality to the purest tin. My alloy-metal thus prepared will always be covered with twenty-five per cent. of pure tin, and as to durability far exceeds that of pure tin, or lead only covered with tin, and is stronger, harder, and stiffer.

I claim to produce tin-foil made of the aforementioned plated alloy-metal bands manufacured in the following manner, viz: I cut small strips, from two to three feet in length, or according to the size of the pair of rollers, about twenty-five to fifty pieces, form a pack thereof, and pass it parallel between a pair of highly-polished rollers until it becomes reduced to thin or thick sheets of foil. Such manufactured foil will prove in all its respects and qualities equal to foil made of the purest tin, and is much cheaper.

I claim, secondly, to manufacture from my plated alloy-metal printed foil made as follows: I take any ornamented pattern-block or piece of ornamented zinc, or anything I intend to print from, ink it in the manner as is usually done by printers. I then take my plain foil and lay it carefully over the pattern, being careful to exclude all air underneath, rub it or press it down by a printing-press and take it off, when it is then done. In the same manner can foil be printed, using, instead of the ink, colorless (plain) varnish, and powder such prepared or damp surface with colored powder or flock.

I claim, thirdly, to manufacture from my plated alloy-metal embossed foil made as follows: I take a sheet of my plain foil and pass it through a pair of embossing-rollers, or I press my plain or colored or printed foil upon an ornamental surface.

I claim, fourthly, to manufacture from my plated alloy-metal foil of any color made as follows: I take a sheet of my plain foil and cover it, by means of a soft brush, with colored varnish of any shade or color desired.

I claim, fifthly, to manufacture from my plated alloy-metal wall and ornamental paper of any size made as follows: I fasten or paste my plain foil upon paper by means of embossing-rollers or paste. I then cover such prepared foil-paper with colored varnish. Of the above I manufacture plain, plain-colored, plain-colored and embossed, plain-colored embossed-printed, and plain-colored embossed-printed and flock foil-paper. The most important advantages of my foil-paper, when colored and embossed or printed only, is that it can, first, be washed without losing its color or damaging it any way; secondly, it can be used for papering damp walls, and is more durable than any material now in use for such purposes; thirdly, it keeps places or rooms free from vermin. Common paste, when mixed with a small proportion of turpentine, (one pound of flour or starch and one ounce of thick turpentine mixed with the paste while warm,) will fasten the paper to the wall in such a manner that it is impossible for any vermin to get or secrete behind. For walls next to water-closets or stables, which are injured by ammonia or saltpeter, papered with my wall or ornamental paper, will not be effected, on account of my paper being thickly covered with tin made from my plated alloy-metal. The whole can be manufactured so cheap as to be within reach of all, and, on account of its durability, will ultimately prove itself much cheaper than ordinary wall-paper

I claim, sixthly, to manufacture from my plated alloy-metal a substitute for carpet, or floor or carpet covering, made as follows: I take a block of my plated alloy-metal, and roll it out between a pair of highly-polished iron rollers to such a thickness, length, and breadth as suits my purpose. Such prepared sizes of my prepared metal can be used as plain, embossed, and embossed-printed. This can likewise be used instead of oil-cloth for covering tables, desks, &c. The above-described sizes of my prepared metal can also be manufactured by dipping it in the solution aforementioned. Its importance and advantage consists in this, that it is a cheap and elegant and desirable substitute for carpet, and whereas it saves the carpet from wear and tear better than any other material. It can also be washed and polished like any plated ware. When entirely worn out it can be remanufactured.

I claim, seventhly, to manufacture from my plated alloy-metal canisters and wrappers made as follows: I take a piece of my plated alloy-metal and cut it according to the required shape. It can then be joined with a common soldering-iron without solder. Likewise this metal can be united by a composition of glue and molasses. Canisters made of this self-soldering metal can be made much quicker, and therefor much cheaper, than any other metal canister or box. Wrappers made of this metal, plain, printed, embossed, or ornamental, are of great importance for perfumers, confectioners, grocers, tea dealers, druggists, chemists, &c., because my alloy-metal, plated with twenty-five per cent. of purest tin, preserves the substance contained therein; and the corrosive substances of snuff or tobacco will in no way affect my plated alloy-metal, like canisters and wrappers made of lead only, or lead thinly plated with tin, which latter-named produces oxidation, (sugar of lead,) so very injurious to health.

I claim, eighthly, to manufacture from my plated alloy-metal, plated with twenty-five per cent. of purest tin, lining for cisterns, water-coolers, &c. For manufacturing such, I take thick sheets of my plated alloy-metal and simply line the vessel, and unite without solder. This kind of lining is of the utmost importance in regard to health, as my cheap metal offers itself as a substitute for lead, zinc, or composition, which are so very injurious to health when used for the above purposes.

I claim, ninthly, to manufacture from my plated alloy-metal, plated with twenty-five per cent. of purest tin, a capsule or covering for necks of bottles, jars, pots, &c., used in the same form as materials now in use for that purpose. The properties and advantages of this covering, which is made from a metal free from every impurity, are, first, its perfect competency to exclude the contact of atmospheric air from the contents of the vessel to which it is applied, thereby effectually preventing mold or decomposition; secondly, it is an entire safeguard against the attack of insects; thirdly, by its close adaptation and adherence to the neck of the bottle, jar, pot, &c., and its capability of resisting great internal pressure, it constitutes, in a measure, a substitute for wire. It can be made so strong as to become a perfect substitute for wire.

I claim, tenthly, as my covers or capsules can be made so very much cheaper than the metallic capsules known for so many years, they can be used for covering nearly any cheap article, and more especially goods to be exported.

What I claim as my invention, and desire to secure by Letters Patent, is—

The aforesaid new and improved plated metal and covered metal, or any other substantially the same, and which will produce the intended effect.

JOHN DANL. GRÜNEBERG.

Witnesses:
JOHN O'BRIEN,
HENRY S. RAINEY.